Patented May 24, 1949

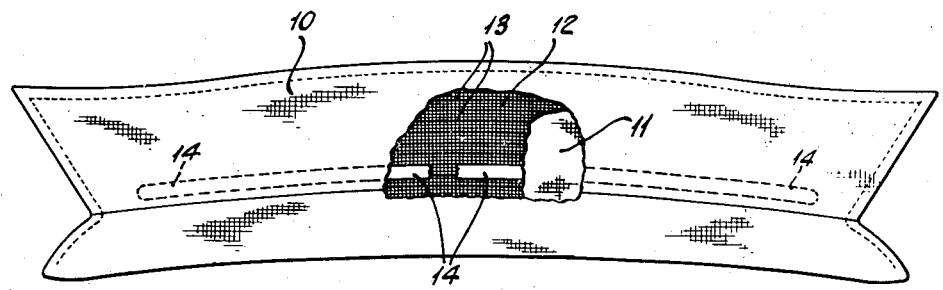
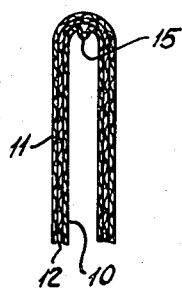

2,471,203

UNITED STATES PATENT OFFICE 2,471,203

ARTICLE OF APPAREL AND METHOD OF MAKING SAME

Arnold Eddy, Middletown, Conn., assignor to Trubenizing Process Corporation, New York, N. Y., a corporation of New York Application February 1, 1946, Serial No. 644,938

3 Claims. (Cl. 2—143)

This invention relates to improvements in an article of apparel and method of making same, more particularly to an article of apparel composed of a plurality of layers or plies of textile fabric fused or coalesced together and having a predetermined fold line, such, for example, as a turn-over collar or cuff.

Such articles are generally made of three plies of material consisting of two outer plies, that is, a top and a bottom ply, and an intermediate lining ply which usually carries the adhesive medium. The lining ply may embody in its construction certain yarns composed wholly or partly of a latently adhesive or thermoplastic substance, such as a cellulose ester or ether, preferably cellulose acetate with or without plasticizers, which substance will become softened and adhesive on treatment with a solvent, or by application of heat, or with both a solvent and heat. The plies are united under pressure while said substance is in softened or thermoplastic adhesive condition, to produce a permanently fused and stiffened composite material that can be laundered.

The article has a fold line of greater flexibility than the rest of the material along which it can be readily and repeatedly folded. My invention pertains especially to the production of such fold line.

I am aware that several proposals have been made to provide fused ply articles with a flexible fold line. These proposals, however, have involved manufacturing difficulties that have increased the cost and slowed-down production. For instance, an insert has been placed between the lining and one or both of the outer plies to prevent adhesion, which insert remains as a permanent part of the article. It has also been proposed to omit or remove the adhesive in the region of the fold line. Another procedure has been to disrupt adhesion along the fold line by mechanical means.

Having in mind the defects of the prior art, it is an object of my invention to provide a fold line without use of a permanent insert, elimination or removal of the adhesive, or disruption of the adhesion.

According to this invention I provide a fused ply article with a preformed flexible fold line by depositing a film on one of the plies in the region of the fold line, which film serves to prevent adhesion during the fusing process and is subsequently removed by dissolving it in water.

The essential properties of the film are that it is sufficiently strong and pliable to permit of handling, and to withstand the pressure used in the fusing process, without cracking or checking; that it is insoluble in the solvents employed in the fusing process; that it is not appreciably affected by the temperatures used in the fusing process; and, that it is readily soluble in hot or cold water.

The invention will appear from the following description thereof, reference being had to the accompanying drawings in which:

Figure 1 is a conventionalized bottom plan view of a collar laid out flat, with parts broken away to illustrate the invention; and Fig. 2 is a fragmentary sectional view of the collar folded.

In the drawings the invention is shown as applied to a collar, which is a preferred embodiment, although it may be applied to other articles of apparel that have a fold line. The collar may consist of two parts, that is, a collar top and a collar band sewed together, or it may be of the so-called one piece type in which the top and band are integral.

On referring to the drawings, 10 indicates the inner or bottom ply, 11 the outer or top ply, and 12 the lining or intermediate ply. The lining may embody in its construction yarns 13 of a cellulose derivative, such as cellulose acetate, that are normally non-adhesive or non-cementitious but that can be gelatinized or peptized by treatment with a solvent to convert them into an adhesive or cementitious state. Among the solvents suitable for that purpose are acetone or an acetone-alcohol mixture. While the latently adhesive substance is in adhesive condition, the plies are united under pressure or under both heat and pressure. In some instances, and with certain solvents, the solvent may be applied simultaneously with application of pressure and heat. In either case the solvent is usually, but not necessarily, applied from the outside after the plies have been assembled in the relationship in which they are to be fused. The fusing process hereindescribed is well known in the art and is subject to modifications. While linings embodying cellulose derivative yarns are preferred, other suitable linings may be used in the practice of my invention, as for example, cotton fabrics coated with latently adhesive cellulose derivative or synthetic resin substance.

In carrying out the invention I form an aqueous solution of a suitable film-forming chemical of controlled concentration and viscosity, and I apply the solution in the form of a narrow band or stripe to one of the plies, usually in the case of a collar to the under or lower face of the lining ply 12, in the region where the fold line is to be formed. The solution may be applied in any suitable manner, as by printing it on the material in the manner well known in the textile art. The solution on drying forms a non-spreading, strong, pliable film 14 on the material, which film is impervious to and insoluable in the solvents used in the fusing process but is readily soluble in water. By reason of the pliability and strength of the film, the material on which it is deposited may be handled and subjected to the pressure used in the fusing process without spreading, breaking or cracking the film. The film is impervious to the peptized or softened adhesive material, and consequently the latent adhesive substance covered or protected by the film will not adhere to the ply adjacent to the film; thus, a flexible fold line is produced. The film provides a barrier that prevents adhesion of an adjacent ply in the zone of the fold line even if the latent adhesive substance should become sticky through access of the solvent from the opposite side or from the edges of the composite.

While I may use any chemical substance that will form a strong and pliable film that is insoluble in the fusing solvents but soluble in water, one that I have found to be particularly suitable is the product known as "Collocel S" manufactured by Dow Chemical Company. The product is a water soluble cellulose ether composed of neutral sodium salt of cellulose glycollic acid or carboxymethyl cellulose. It has good film forming properties, is odorless, non-toxic, and is stable to heat without discoloration up to about 175° C., a temperature in excess of any used in the fusing process.

An aqueous solution of this chemical may be prepared by dissolving it in water heated to about 60° to 70° C. while vigorously agitating the mixture. This results in a neutral, colorless solution that may have a wide range of viscosity. While the amount of the substance in solution may be varied considerably, depending on the viscosity and penetrability desired, I have found that the most satisfactory results are obtained with use of a 7% solution.

An aqueous solution of tragacanth may also be used containing from about 5% to 10% of tragacanth in solution. Furthermore, a mixture may be made of "Collocel S" and tragacanth. I have found that a mixture of 7 parts of a 5% solution of "Collocel S" and 3 parts of a 10% solution of tragacanth gives fairly satisfactory results.

As hereinbefore stated, in the case of a turn-over collar, it is preferable to apply the solution so that only the inner or bottom ply 10 will be free of adhesion to the lining along the fold line 15, as shown in Fig. 2. For this purpose it is best to use a 7% "Collocel S" solution. Such solution has a sufficiently high viscosity that it will not penetrate through the lining and will form or deposit a film only on the surface to which it is applied.

In some instances it may be desired to have a fold line free of adhesion to both faces of the lining. In such cases a solution of lower viscosity may be used that will penetrate through the material to form films on both surfaces.

While I prefer to apply the film forming solution to one surface only of the lining it may be applied to both surfaces, or instead of applying it to the lining it may be applied to one or both of the outer plies in the zone of the fold line.

The solution on drying forms a very thin film that does not appreciably increase the bulk of the collar or other article to which it is applied, and since the film is soluble in water it will be dissolved and completely removed on the first laundering or washing of the article.

What I claim is:

1. The method of producing a flexible fold line in an article of apparel having a plurality of plies of textile fabric fused together one of which contains a latently adhesive substance that is capable of being rendered adhesive by treatment with a solvent, which comprises applying to one of the plies along the predetermined fold line a coating of an aqueous solution of carboxymethyl cellulose, and drying the coating to form a non-spreading, strong pliable adhesion preventive film thereon which film is impervious to and insoluble in the solvent used to fuse the plies but is soluble in water.

2. The method of producing a flexible fold line in an article of apparel having a plurality of plies of textile fabric fused together one of which embodies in its construction yarns of a latently adhesive cellulose derivative substance that is capable of being rendered adhesive by treatment with acetone, which comprises applying to one of the plies along the predetermined fold line a coating of an aqueous solution containing about 7% of carboxymethyl cellulose, and drying the coating to form a non-spreading, strong pliable adhesion preventive film thereon which film is impervious to and insoluble in acetone but is soluble in water.

3. A washable article of wearing apparel having a preformed fold line, comprising a pair of external plies, an intermediate lining ply adhesively secured to at least one of said external plies, and a narrow, non-spreading, film of carboxymethyl cellulose on one of the plies in the region of the fold line to prevent adhesion of said ply to an adjacent ply along said zone, said film being completely dissolved and thereby removed from the article on the first washing thereof.

ARNOLD EDDY.

REFERENCES CITED

The following references are of record in the file of this patent:

UNITED STATES PATENTS

| Number | Name | Date |
|---|---|---|
| 2,118,407 | Liebowitz | May 24, 1938 |